(No Model.)

G. HAVELL & A. G. WILLIAMS.
COMBINED PIPE BOWL COVER AND STUFFER.

No. 321,104. Patented June 30, 1885.

Attest.
W. F. Craue.
J. O. Clark

Inventors.
George Havell,
Alfred G. Williams

United States Patent Office.

GEORGE HAVELL AND ALFRED G. WILLIAMS, OF NEWARK, NEW JERSEY, ASSIGNORS TO WM. DEMUTH & CO., OF NEW YORK, N. Y.

COMBINED PIPE-BOWL COVER AND STUFFER.

SPECIFICATION forming part of Letters Patent No. 321,104, dated June 30, 1885.

Application filed August 7, 1884. (No model.)

*To all whom it may concern:*

Be it known that we, GEORGE HAVELL and ALFRED G. WILLIAMS, citizens of the United States, residing in the city of Newark, in the county of Essex and State of New Jersey, have invented certain new and useful Improvements in Combined Pipe-Bowl Covers and Stuffers, fully described and represented in the following specification and the accompanying drawings, forming a part of the same.

Our invention relates to an improvement in pipe-bowl covers and stuffers; and it consists in the combination of the pipe-bowl with a hinged cover having a slotted bottom plate, the telescopic rings, their expanding-spring, and the plunger-rod provided with the short feather $a$ and knob N, whereby the rod may be turned and the plunger locked inside the bowl.

Our invention may be readily understood by reference to the annexed drawings, in which—

Figure 1:
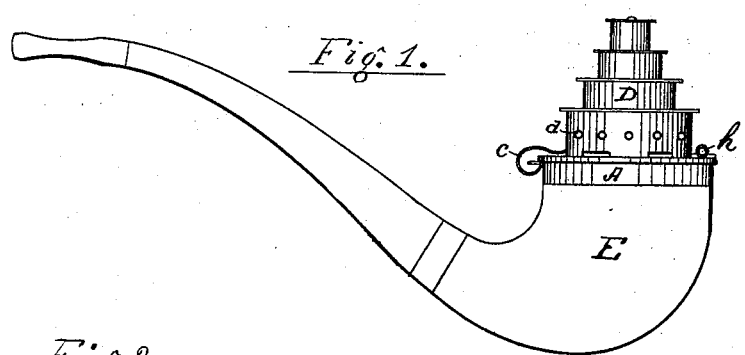
Figure 2:
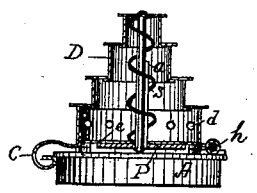
Figure 3:
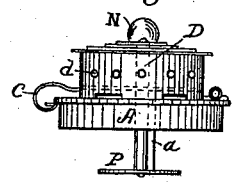
Figure 5:
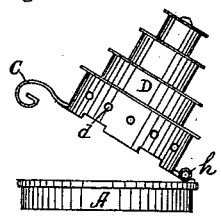
Figure 4:
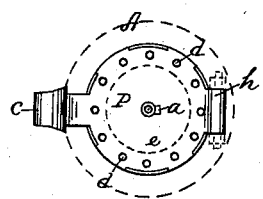

Figure 1 shows our improved pipe cover and stuffer attached to the bowl of a pipe. Fig. 2 is a central section showing internal construction. Fig. 3 represents the plunger P pushed down to its furthest extent. Fig. 4 is a view of the under side of the hinged cover D, and showing the construction, and a slot in the bottom and a projection on the plunger-rod to fit the slot, to prevent the plunger from turning, and also to hold it in place when pushed down, as hereinafter described, the plunger being represented in dotted lines. Fig. 5 represents cover D partially raised for lighting pipe or other purpose.

The construction is best seen in the section of Fig. 2, where the plunger is seen in the position it occupies when not in use, held erect by a spring, $s$, which also tends to extend the telescopic pieces of the cover D. A piece of metal, $e$, Fig. 4, having a slot, $b$, and hole through which the plunger-rod passes, is placed at the mouth of the largest telescopic ring, and limits the action of the spring by the plunger striking against it. The upper and smaller telescopic section of the cover is also closed to form an abutment for the spring; but the plunger-rod passes through it, and is provided with a knob, N, at its outer end. The cover D is hinged to the bowl-rim A by a hinge, $h$, and held down by spring-catch $c$.

The device is operated by pressing with the fingers on the top of the cover D, which forces the plunger through the opening in the bowl-rim A down into the bowl of the pipe E, and is intended when in use to compress the ashes and tobacco in the pipe as the latter burns. The instant that the pressure of the fingers is relaxed the plunger returns to its natural position. (Shown in Fig. 1.) The cover D being hinged, the pipe is readily filled or emptied, and the light applied by unfastening the catch $c$.

Air-holes $d$ may be provided in the telescopic rings and in the plate or bottom $e$ of the cover D.

The projection $a$ is formed as a feather upon the plunger-rod, but terminates at the point to which the rod is depressed when the sections of the cover are all pushed into one another, as shown in Fig. 3.

The sections may be locked in such closed position by twisting the knob N and turning the feather $a$ out of the slot $b$, the end of the feather then pressing against the under side of the plate $e$, and preventing the retraction of the plunger or the expansion of the telescopic cover. When thus closed the pipe-cover takes very little room, and the pipe is much more convenient to place in the pocket, while the turning of the knob immediately restores the spring and plunger to the use of their functions.

We are aware that it is not new to make a pipe-cover with a plunger that can be locked within the same, and do not therefore claim such a device, broadly; but, Having shown the nature and operation of our own construction, we claim the telescopic or collapsible cover described herein in the following manner:

The combination of the pipe-bowl with a hinged cover having a slotted bottom plate, the telescopic rings, their expanding-spring, and the plunger-rod provided with the short feather *a* and knob N, whereby the rod may be turned and the plunger locked inside the bowl, substantially as and for the purpose set forth.

In testimony whereof we have hereunto set our hands in the presence of two subscribing witnesses.

GEORGE HAVELL.
ALFRED G. WILLIAMS.

Witnesses:
J. D. CLARK,
W. F. D. CRANE.